Dec. 4, 1945.         C. C. UTZ              2,390,231
                  STEERING MECHANISM
             Filed Nov. 10, 1943        3 Sheets-Sheet 1
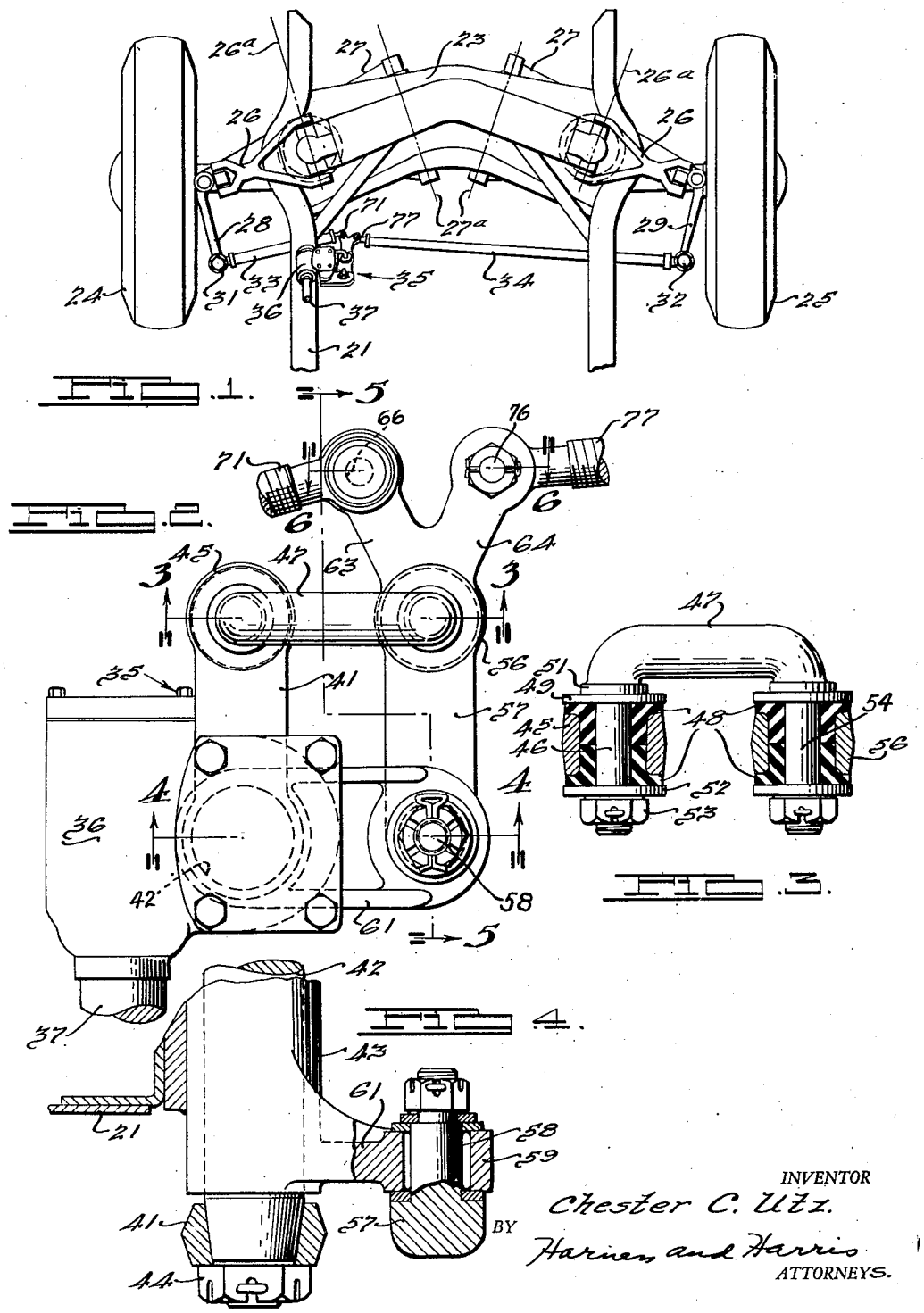
INVENTOR
Chester C. Utz.
BY Harness and Harris
ATTORNEYS.

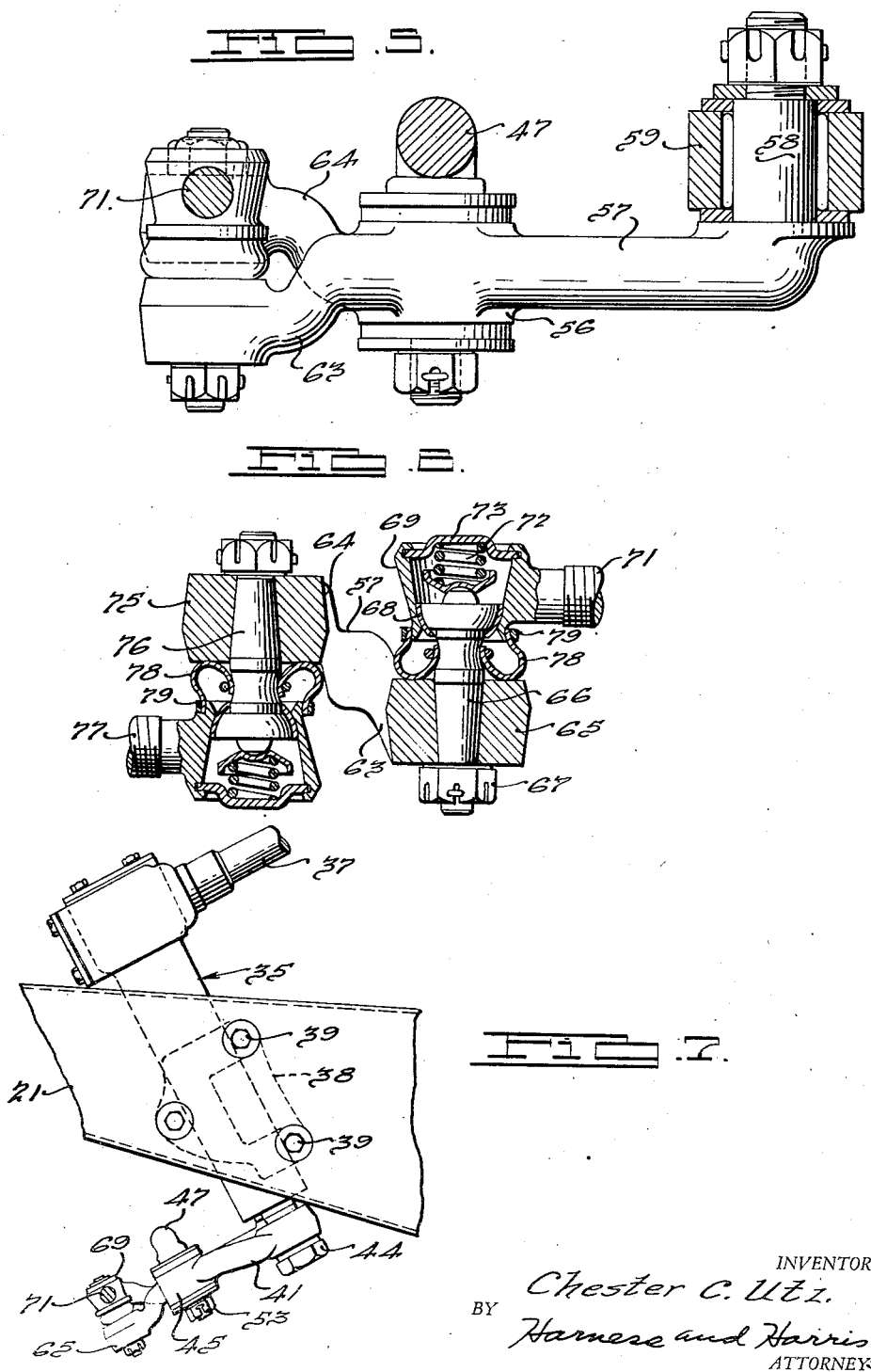

Dec. 4, 1945.    C. C. UTZ    2,390,231
STEERING MECHANISM
Filed Nov. 10, 1943    3 Sheets-Sheet 3
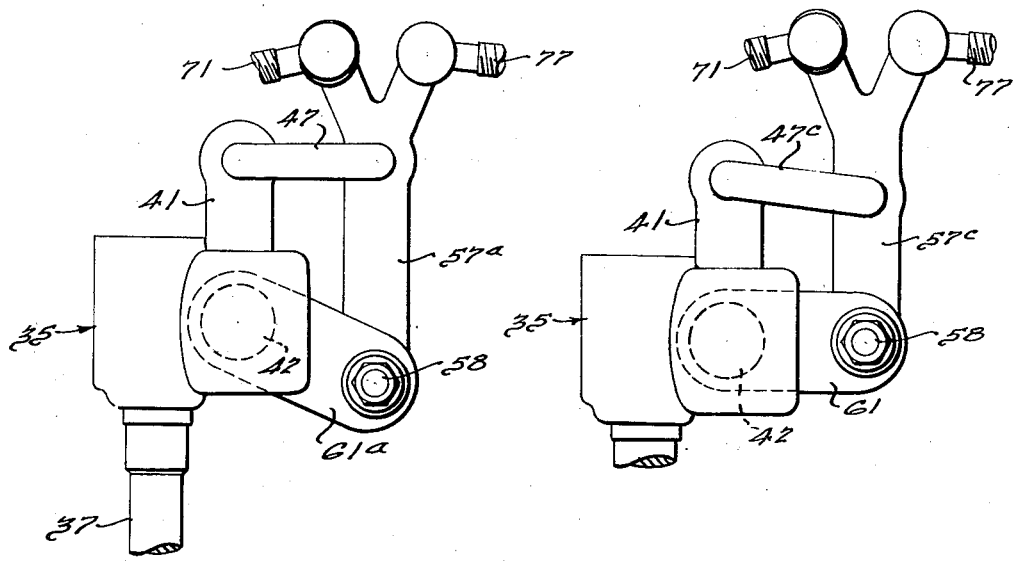
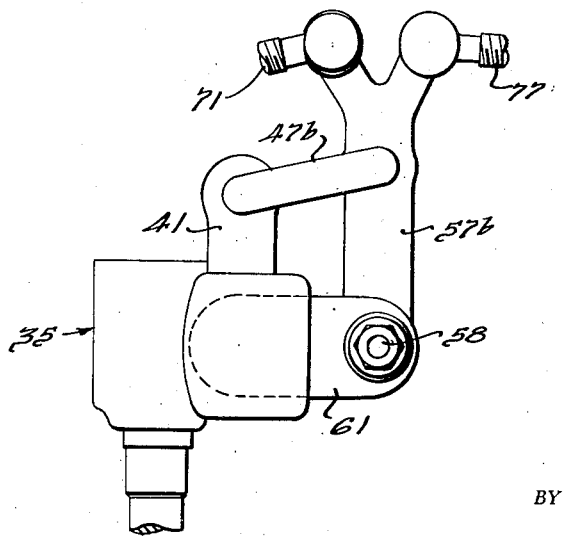
INVENTOR
Chester C. Utz.
BY Harness and Harris
ATTORNEYS.

Patented Dec. 4, 1945

2,390,231

UNITED STATES PATENT OFFICE 2,390,231

STEERING MECHANISM

Chester C. Utz, Magnolia (Redford Station), Mich., assignor to Chrysler Corporation, Highland Park, Mich., a corporation of Delaware Application November 10, 1943, Serial No. 509,701

12 Claims. (Cl. 280—95)

This invention relates to steering mechanism for motor vehicles, and it has particular reference to an improved steering linkage readily adapted to automobiles wherein the steering column is remotely positioned with respect to the vertical longitudinal mid plane of the car.

Heretofore, it has been commonplace to locate the steering wheel to one side of the vertical longitudinal mid plane and to connect the wheel to the front or steerable wheels of the vehicle by any of a variety of linkages. However, when the links extending to each wheel are of different lengths, a limit is reached for the position of the column with respect to the vertical longitudinal mid plane which, if exceeded, creates poor steering geometry, wheel fight, and unsatisfactory distribution of stresses among the various components of the mechanism. The present invention provides a solution for these defects.

An object of the present invention is to provide an improvement in steering mechanism for vehicle wheels.

Another object is to improve steering mechanism for vehicle wheels, which mechanism is operable from a point well displaced from the vertical longitudinal mid plane of the vehicle.

A further object is the provision of an improvement in a steering mechanism in which long and short tie rods are used because of control of the steering mechanism from a point displaced from the vertical longitudinal mid plane of the vehicle.

Another object is to provide a control for steering mechanism operable farther to the side of the vehicle than the operable limit of difference in length of the rods will permit.

Other objects will appear from the disclosure.

Fig. 1 is a plan view of the front end of an automobile chassis incorporating the invention;

Fig. 2 is an enlarged fragmentary plan view of the steering linkage shown in Fig. 1;

Figs. 3, 4, 5 and 6 are sectional views taken substantially along the correspondingly numbered section lines of Fig. 2;

Fig. 7 is a fragmentary side elevation showing the linkage mounted on the chassis frame; and Figs. 8, 9 and 10 are simplified plan views of variants of the novel linkage.

The invention is shown in Fig. 1 as applied to an automobile having longitudinal frame members 21 and 22 coupled at the front end by a cross member 23, to which are affixed to a pair of steerable road wheels 24 and 25. These wheels are independently mounted by means including upper and lower pivoted and angularly disposed arms 26 and 27, whose pivot axes 26a and 27a converge and intersect at approximately the vertical longitudinal mid plane of the car. Other details of the wheel mounting need not be dwelt upon here, since they are well understood and form no part of this invention. Steering arms 28 and 29 are connected to each wheel assembly, to provide link members for turning and steering purposes. The arm 28 is connected, through a pivot 31, to another link 33, which may be termed a short tie rod, and the arm 29 is connected, through a pivot 32, to a link 34 which constitutes a long tie rod. These tie rods are connected to, and are actuated by, mechanism generally designated by the reference numeral 35 in Fig. 1, and hereinafter more fully described. Such mechanism includes a steering chuck 36, the details of which are well known, and a shaft 37 which extends up within the car body for rotation by the driver through the usual steering wheel.

From the standpoint of theoretical geometry the tie rods to the steerable wheels should be of equal length, but actually tie rods of equal length, when of a length to extend to a common point at the vertical longitudinal mid plane of the car, set up wheel fight. One known manner of eliminating wheel fight is to use one short tie rod and to increase the length of the other tie rod to make it reach the short tie rod. This is the arrangement of the tie rods 33 and 34. There is a practical limit to the shortness of the short tie rod, or, in other words, the short tie rod has some significant length with respect to the distance between the wheels and the length of the other tie rod. In the construction of Fig. 1 the ratio of the lengths should not exceed ten to three.

In order to stay within this limit, it is therefore necessary to position the steering column and chuck 36 at a suitable place in the car, and generally in line with the meeting ends of the links 33 and 34. For many automobiles, this is entirely feasible, but the desired alignment is not attainable in cars equipped with comparatively wide front seats,—i. e., those which will safely and comfortably hold three normal size adults instead of the usual two. With such cars, the necessity of providing adequately wide seats impels the shifting, to the left in American automobiles, of the steering wheel and column to such a degree that the desired alignment and rod ratio cannot be maintained.

According to the present invention, both the desired rod length ratio and increase in front seat width can be obtained, by means of a novel linkage mechanism. Referring to Figs. 2 and 7, the steering chuck 36 is mounted on the left hand frame member 21, being secured thereto at an angle to the vertical by a clamp 38 and bolts 39. Rotation of the steering shaft rod 37 actuates the worm, or other mechanism, to swing a pitman arm 41, which is carried by a rotatable shaft 42, contained in a housing portion 43 of the chuck 36, being secured by a lock nut 44 (see Fig. 4). The pitman arm 41 extends forwardly and downwardly, and it is formed at its front end with an eye 45 adapted to receive a stud 46 formed on a U-shaped link 47. Rubber bushings 48 are inserted in the eye and around the stud, being held in place by an upper washer 49 abutting a shoulder 51 formed on link 47, and a second washer 52 engaged by a lock nut 53. The bushings 48 fit snugly between the stud 46 and the wall of the eye, so that, when the nut 53 is drawn up, free rotation of the stud and link 47, with respect to the arm 41, cannot occur. However, limited relative movement may occur when the angle between the arm 41 and the link 47 is changed, the bushings yielding to the torsional stresses applied thereto. The resilience of the bushings also serves to cushion the mechanism from transmission of road shocks and vibrations back to the steering wheel, while the torsional strain developed aid in restoring the linkage to a straight line driving position.

The opposite end of the link 47 is formed with a stud 54, which, by the same means as have just been described, is secured in an eye portion 56 of an auxiliary arm 57, extending generally parallel to the arm 41. The rear portion of the arm 57 is provided with an upstanding stud 58, rotatably mounted in a bearing boss 59 formed at the end of a bracket 61 which is integral with the housing section 43. The arms 41 and 57 are therefore both free to rotate, but are constrained to move in unison and parallel to each other, by the interconnection provided by the link 47. As such rotary movement takes place, the change in angularity is absorbed by the torsional strains set up in the bushings 48.

The front end of the arm 57 is formed in two branches 63 and 64, extending to the left and right respectively, and so turned, as shown in Figs. 5 and 6, that the left branch 63 terminates in a plane below the axis of the arm 57, while the right hand tine 64 lies above. This produces a configuration something like a wishbone, and compensates for the difference in angularities which otherwise would exist between the short and long tie rods 33 and 34, which are connected to the branches. The branch 63 terminates in an eye 65, formed with a tapered bore receiving a stud 66, which is secured by a lock nut 67. The upper end of the stud is of spherical shape, to engage a semi-spherical washer 68 contained in socket piece 69 having a threaded rod 71 extending therefrom. The rod is threaded into an internal tap in the short tie rod 33, as indicated in Fig. 1. The ball joint between the stud 66 and piece 69 is maintained by a spring and washer assembly 72, held within the socket and against the end of the stud by a cap 73. The rod 71, and its attached tie rod 33, may therefore turn in any direction with respect to the arm 57, either during steering operations, or in response to vertical movements of the wheel 24.

The long tie rod 34 is connected in like manner to the branch 64, except that it lies above the axis of the arm 57, instead of being below it. The connection is made through an eye 75 on the branch 69, ball connected to a stud 76 with spherical head, and threaded rod 77, by duplicates of the parts heretofore described. Each of the joints is protected against dirt by rubber sleeves 78 which encircle the studs, and are secured to the socket pieces by bands 79.

When the steering post 37 is turned, the arm 41 is swung to the right or left, as the case may be, thus imparting a like motion to the arm 57, and thereby the rods 33 and 34. The axes of the studs 66 and 76 are so located, with respect to the axis of the stud 58, that the pivoted end of the link 71 travels in a substantially linear direction when the motion is in one direction, and the link 77 follows a flat path when the motion is in the opposite direction. The length of the bracket 61 is, of course, so chosen as to impart a working length to the short tie rod 33 which satisfies the ratio heretofore discussed.

The link system, 41, 47, 57, 61, need not be rectilinear, as shown in Fig. 2, but may be varied to suit special conditions that may be encountered. As shown in Fig. 8, a bracket 61a is turned back toward the mid-portion of the car, and its length is increased to maintain the same transverse distance between the axis of shaft 42 and stud 58 as in Fig. 2. The effective length of an arm 57a is thereby increased; i. e., the length of the arm 57a between link 47 and stud 58 is greater than the length of the pitman arm 41 between link 47 and shaft 42. Thus an even flatter arc is imparted to the pivoted ends of rods 71 and 77. This curtails the vertical displacements to which these ends are subject during operation.

Fig. 9 shows a similar link system, but here the right end of a link 47b is somewhat forward of its left end. Thus the length of an arm 57b between link 47b and stud 58 is greater than the length of pitman arm 41 between link 47b and shaft 42. As in Fig. 8, a flatter arc is imparted to the ends of rods 71 and 77.

In Fig. 10, on the other hand, a link 47c has its right end rearward to its left end, the result being that the length of an arm 57c between link 47c and stud 58 is less than the length of pitman arm 41 between 47c and shaft 42. Thus the rate of angular movement of arm 57c is greater than that of pitman arm 41, and a more rapid action or response of the road wheels to movement of the steering wheel is obtained.

It will be apparent from the foregoing description that new and novel steering mechanisms have been provided. Essentially they involve linkages permitting a displacement of a steering member from the region to which the inner ends of the tie rods extend. The drawings illustrate the various forms of the novel mechanisms as applied to tie rods of unequal lengths, and these novel mechanisms are of special advantage when they are applied to these arrangements of the rods, for then the dimensions of the linkage transverse of the car may be small, and the linkages function with greater facility. However, it is to be understood that the invention is not to be limited to these arrangements of tie rods.

While the invention has been described with respect to one form and variations and modifications thereof, it is intended that it should not be limited thereto, but should be accorded a scope commensurate with the context of the following claims.

I claim:

1. In a steering mechanism for a car having steerable road wheels, a steering chuck mounted to one side of the vertical longitudinal mid plane of the car and adjacent one of the road wheels, a pitman arm rotatably connected to and operated by the chuck, a bracket extending inwardly toward the vertical longitudinal mid plane of the car from the chuck, a second arm rotatably mounted in the bracket, a link interconnecting the free end of the pitman arm and the second arm intermediate the bracket and the forward end of the second arm, ball joints on the forward end of the second arm, and relatively short and long tie rods connected to the ball joints and respectively to the road wheels.

2. Steering mechanism for a vehicle having steerable wheels, comprising a first operator-controlled arm having a pivotal mounting at one end on the vehicle and extending in a certain general direction from the pivotal mounting, a second arm displaced from the first arm and having a pivotal mounting at one end on the vehicle and extending from its pivotal mounting in the same general direction as the first arm, and link means interconnecting a point on the first arm spaced from its pivotal mounting and a point on the second arm having a greater spacing from its pivotal mounting than that of the point on the first arm from its pivotal mounting, and tie rods connecting the free end of the second arm and the wheels.

3. Steering mechanism for a vehicle having steerable wheels, comprising a first operator-controlled arm having a pivotal mounting at one end on the vehicle and extending in a certain general direction from the pivotal mounting, a second arm displaced from the first arm and having a pivotal mounting at one end on the vehicle and extending from its pivotal mounting in the same general direction as the first arm, link means interconnecting a point on the first arm spaced from its pivotal mounting and a point on the second arm having a lesser spacing from its pivotal mounting than that of the point on the first arm from its pivotal mounting, and tie rods connecting the free end of the second arm and the wheels.

4. Steering mechanism for a vehicle having steerable wheels, comprising a first operator-controlled arm having a pivotal mounting at one end on the vehicle and extending generally longitudinally of the vehicle forwardly from its pivotal mounting, a second arm displaced from the first arm transversely of the vehicle and having a pivotal mounting at one end on the vehicle rearward of that of the first arm and extending generally longitudinally of the vehicle forwardly from its pivotal mounting, link means interconnecting a point on the first arm spaced from its pivotal mounting and a point on the second arm having a greater spacing from its pivotal mounting than that of the point on the first arm from its pivotal mounting, and tie rods connecting the free end of the second arm and the wheels.

5. Steering mechanism for a vehicle having steerable wheels, comprising a first operator-controlled arm having a pivotal mounting at one end on the vehicle and extending generally longitudinally of the vehicle forwardly from its pivotal mounting, a second arm displaced from the first arm transversely of the vehicle and having a pivotal mounting at one end on the vehicle directly transverse of that of the first arm and extending generally longitudinally of the vehicle forwardly from its pivotal mounting, link means interconnecting a point on the first arm spaced from its pivotal mounting and a point on the second arm forward of the point on the first arm having a greater spacing from its pivotal mounting than that of the point on the first arm from its pivotal mounting, and tie rods connecting the free end of the second arm and the wheels.

6. Steering mechanism for a vehicle having steerable wheels, comprising a first operator-controlled arm having a pivotal mounting at one end on the vehicle and extending generally longitudinally of the vehicle forwardly from its pivotal mounting, a second arm displaced from the first arm transversely of the vehicle and having a pivotal mounting at one end on the vehicle directly transverse of that of the first arm and extending generally longitudinally of the vehicle forwardly from its pivotal mounting, link means interconnecting a point on the first arm spaced from its pivotal mounting and a point on the second arm rearward of the point on the first arm having a lesser spacing from its pivotal mounting than that of the point on the first arm from its pivotal mounting, and tie rods connecting the free end of the second arm and the wheels.

7. Steering mechanism for a vehicle having steerable wheels, comprising a first operator-controlled arm having a pivotal mounting at one end on the vehicle and extending in a certain general direction from its pivotal mounting, a second arm displaced from the first arm and having a pivotal mounting at one end on the vehicle and extending in the same general direction as the first arm, link means interconnecting a point on the first arm spaced from its pivotal mounting and a point on the second arm having a spacing from its pivotal mounting different from that of the point on the first arm from its pivotal mounting, and tie rods connecting the free end of the second arm and the wheels.

8. Steering mechanism for a vehicle having a frame and steerable wheels, said mechanism comprising a steering chuck mounted on one side of the car frame, a pitman arm rotatable through said chuck, a bracket extending from the chuck inwardly toward the vertical longitudinal mid plane of the car, a second arm pivotally connected to the bracket, a link interconnecting a point on the pitman arm spaced from its axis of rotation and a point on the second arm having a greater spacing from its pivotal mounting than that of the point on the pitman arm from its axis of rotation to form a quadrilateral linkage wherein a certain angular movement of the pitman arm produces a certain less angular movement of the second arm, relatively short and long tie rods pivotally connected to the second arm, and means for connecting said rods to the steerable wheels of the car.

9. In a steering mechanism for a car having steerable road wheels, a steering chuck mounted to one side of the vertical longitudinal mid plane of the car and adjacent one of the road wheels, a pitman arm rotatably connected to and operated by the chuck, a bracket extending inwardly toward the vertical longitudinal mid plane of the car from the chuck, a second arm rotatably mounted in the bracket, a link interconnecting a point of the pitman arm spaced from its axis of rotation and a point on the second arm having a lesser spacing from its axis of rotation than that of the point on the pitman arm from its axis of rotation, and relatively short and long tie rods connected to the second arm and respectively to the road wheels.

10. Steering mechanism for a vehicle having steerable wheels, comprising a first operator-controlled arm displaced to one side of the vertical longitudinal mid plane of the vehicle, having a pivotal mounting at one end on the vehicle, and extending in a certain general direction from the pivotal mounting, a second arm displaced from the first arm on the side thereof toward the vertical longitudinal mid plane and having a pivotal mounting at one end on the vehicle and extending from its pivotal mounting in the same general direction as the first arm, link means interconnecting the arms for causing movement of the first arm to effect generally parallel movement of the second arm, and tie rods leading to the steerable wheels and directly connected to the second arm at a portion thereof spaced farther from the pivotal mounting thereof than is the region of connection of the link means interconnecting the arms.

11. Steering mechanism for the road wheels of a motor car comprising a chuck including a rotatable pitman arm mounted to one side of the vertical longitudinal mid plane of the car, a second arm rotatably mounted between the pitman arm and the vertical longitudinal mid plane of the car, a link interconnecting the arms for conjoint movement, and relatively short and long tie rods directly connected to the second arm at a region thereof spaced farther from the pivot of the second arm than is the region of connection of the link interconnecting the arms and leading to the road wheels.

12. Steering mechanism for the road wheels of a motor car comprising a chuck including a rotatable pivotally mounted pitman arm, a second pivotally mounted arm extending generally parallel to the pitman arm in the same direction from its pivot mounting as the pitman arm, link means interconnecting the arms for effecting conjoint movement thereof, and tie rods leading to the road wheels and directly connected to the second arm at a region thereof farther from the pivot mounting than is the region of connection of the link means.

CHESTER C. UTZ.